United States Patent [19]

Heidorn

[11] Patent Number: 5,308,106
[45] Date of Patent: May 3, 1994

[54] AIR BAG MODULE COVER ASSEMBLY WITH HORN BLOWING SWITCH

[75] Inventor: Michael E. Heidorn, Royal Oak, Mich.

[73] Assignee: TRW Inc., Lyndhurst, Ohio

[21] Appl. No.: 592,948

[22] Filed: Oct. 4, 1990

[51] Int. Cl.⁵ .............................................. B60R 21/16
[52] U.S. Cl. .............................. 280/728 B; 200/61.54
[58] Field of Search ............................... 280/728-732, 280/743; 200/61.54, 61.55, 61.56, 61.57

[56] References Cited

U.S. PATENT DOCUMENTS

| | | |
|---|---|---|
| 4,612,425 | 9/1986 | Kanai et al. ........................ 200/61.55 |
| 4,934,735 | 6/1990 | Embach .............................. 280/731 |
| 5,002,306 | 3/1991 | Hiramitsu et al. ................... 280/731 |
| 5,062,661 | 11/1991 | Winget ................................ 280/731 |
| 5,085,462 | 2/1992 | Gualtier ............................. 200/61.54 |

Primary Examiner—Margaret A. Focarino
Assistant Examiner—Paul Dickson
Attorney, Agent, or Firm—Calfee Halter & Griswold

[57] ABSTRACT

An air bag module cover assembly incorporates a horn blowing switch. The air bag module comprises a container holding an inflator and a folded air bag. The cover assembly comprises a closure which closes the container, and a horn blowing switch subassembly which is attached to the container. Access to the horn blowing switch subassembly is possible without disturbing the container or removing the module from the vehicle. Moreover, the horn blowing switch subassembly is located for convenient operation by a vehicle operator. It is also adapted to remain integrally connected with a structural portion of the container during deployment of the air bag.

19 Claims, 13 Drawing Sheets

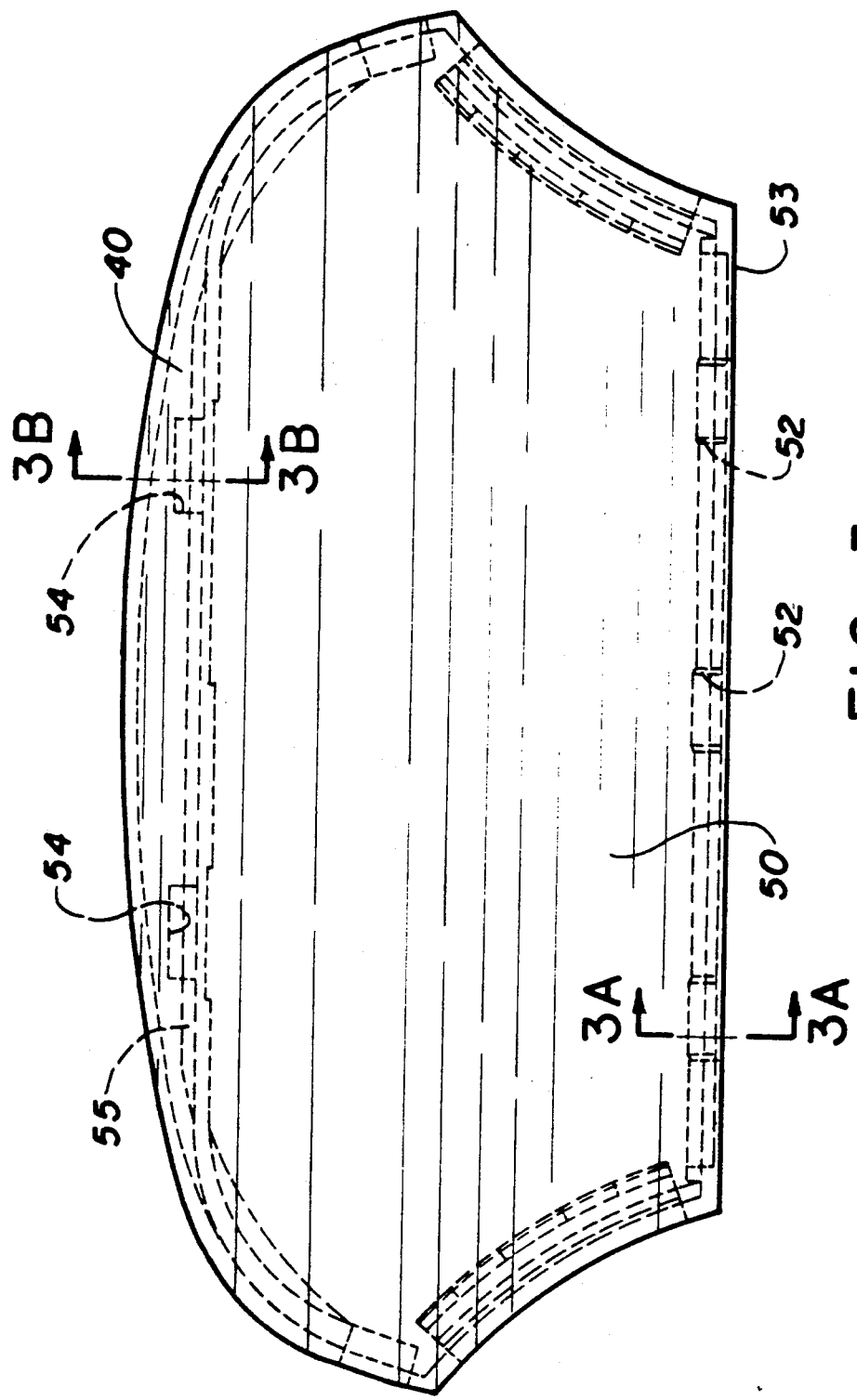

AIR BAG MODULE COVER ASSEMBLY WITH HORN BLOWING SWITCH

TECHNICAL FIELD

The present invention relates to an air bag module cover assembly in which a horn blowing switch is incorporated.

BACKGROUND OF THE INVENTION

Vehicle air bag modules with incorporated horn blowing switches are known. Some examples of such vehicle air bag modules are shown in U.S. Pat. Nos. 3,819,205 to Dunford, et al., 4,325,568 to Clark, et al., and 4,785,144 to Fosnaugh, et al. In each of the foregoing patents, a horn blowing switch is incorporated into a vehicle air bag module in such a way that the entire module has to be removed from the vehicle steering wheel in order to obtain access to the horn blowing switch.

For example, each of U.S. Pat. Nos. 3,819,205 and 4,325,568 discloses a vehicle air bag module with a horn blowing switch connected to an internal, structural portion of the module. In each patent, it is necessary to separate the module from the vehicle in order to obtain access to the horn blowing switch.

U.S. Pat. No. 4,785,144 discloses a horn blowing switch incorporated into the rear of a vehicle air bag module. The horn blowing switch comprises a plate secured to the steering shaft behind the module, and flanges projecting from the module. The plate and the flanges are held apart by compression springs. Pressing the cover of the module moves the entire module toward the plate and compresses the springs. When the plate engages at least one of the flanges, the horn blowing switch is actuated. Access to the horn blowing switch requires removal of the module from a vehicle.

SUMMARY OF THE INVENTION

The present invention provides a new and useful air bag module cover assembly in which a horn blowing switch is incorporated. When an air bag module with the cover assembly is attached to a vehicle, access to the horn blowing switch can be achieved, either for repair or replacement, without removing the air bag module from the vehicle. Moreover, the horn blowing switch can be attached to, or removed from, the cover assembly without disturbing the basic structure of the module.

The vehicle air bag module of the present invention comprises a container that holds an inflator and a folded air bag. The cover assembly according to the invention includes a closure, which completes the container, and a horn blowing switch subassembly. The switch subassembly is attached to the container and is maintained against an outer surface of the closure. The closure has portions which are adapted to separate under pressure. Separation of the closure portions enables the air bag to be forced through the closure in the event of actuation of the air bag module. The horn blowing switch subassembly is attached to the container in such a manner that the horn blowing switch subassembly can be (i) actuated without depressing the entire module and (ii) accessed without removing the module from the vehicle.

The horn blowing switch subassembly comprises a horn blowing switch, a rigid support member, and a flexible decorative cover. The horn blowing switch comprises a pair of contact members separated by a compressible spacer. The rigid support member provides a relatively rigid backing for one of the contact members, and also provides a support for the cover. The rigid support member is adapted to be disposed against an outer surface of the closure. The cover conceals the horn blowing switch and forms an outer, decorative cover for the module. The cover is flexible, and is adapted to communicate physical pressure exerted on the cover to one of the contact members of the horn blowing switch. Such pressure brings the contact members into engagement and thereby completes a horn blowing circuit.

The closure is made of a thermoplastic material and is adapted to be attached to a structural portion of the container. A tear seam is integrally formed in the closure. The tear seam enables the closure to separate, under pressure, into a pair of segments which form an opening for deployment of an air bag. According to the preferred embodiment, the horn blowing switch subassembly is connected with an external structural portion of the container. The horn blowing switch subassembly is adapted to remain connected with the module during deployment of the air bag. Also, the horn blowing switch subassembly is attached to the module in a manner such that the horn blowing switch subassembly can be accessed without disturbing the basic structure of the module.

According to the preferred embodiment of the present invention, the horn blowing switch subassembly is attached to the container by attaching integral extensions of the contact members to the container. The remaining portions of the horn blowing switch subassembly are connected with the contact members and a portion of the closure in such a manner that the horn blowing switch subassembly and the portion of the closure form an integral unit. During deployment of the air bag, the contact members act as tethers to keep the horn blowing switch subassembly attached to the container. Thus, the structural integrity of the module is maintained during deployment of the air bag.

The decorative cover encloses the horn blowing switch. The decorative cover is adapted to be coupled to the rigid support member. The rigid support member is connected to the closure and to at least one of the contact members. The cover and rigid support member are thus coupled to the closure and the contact members, and comprise part of an integral unit formed by the horn blowing switch subassembly and the portion of the closure. The decorative cover and rigid support member are adapted to remain coupled to the contact members and to the portion of the closure when the closure separates during deployment of the air bag. Thus, the integrity of the rigid support member and the cover, as well as the entire cover assembly, is maintained during deployment of the air bag. Moreover, the decorative cover and rigid support member should remain substantially intact after deployment of the air bag. Thus, when the module is replaced, it is possible to reuse the decorative cover and rigid support member in forming a replacement module.

To replace a used module, a new container may be provided. The horn blowing switch subassembly can then be connected to the container to complete the module. The cover and the rigid support member can be new parts, or they can be a reusable cover and rigid support member which remained intact after deployment of an air bag. After installation of the new module, access to the horn blowing switch contact members and the cover can be achieved for repair or replacement, without disturbing the remainder of the module.

The further features of the present invention will become apparent from the following detailed description and the accompanying drawings.

DESCRIPTION OF THE DRAWINGS

FIG. 3 is a front view of the flexible decorative cover of FIG. 2;

DETAILED DESCRIPTION OF THE PREFERRED EMBODIMENT

Figure 1:
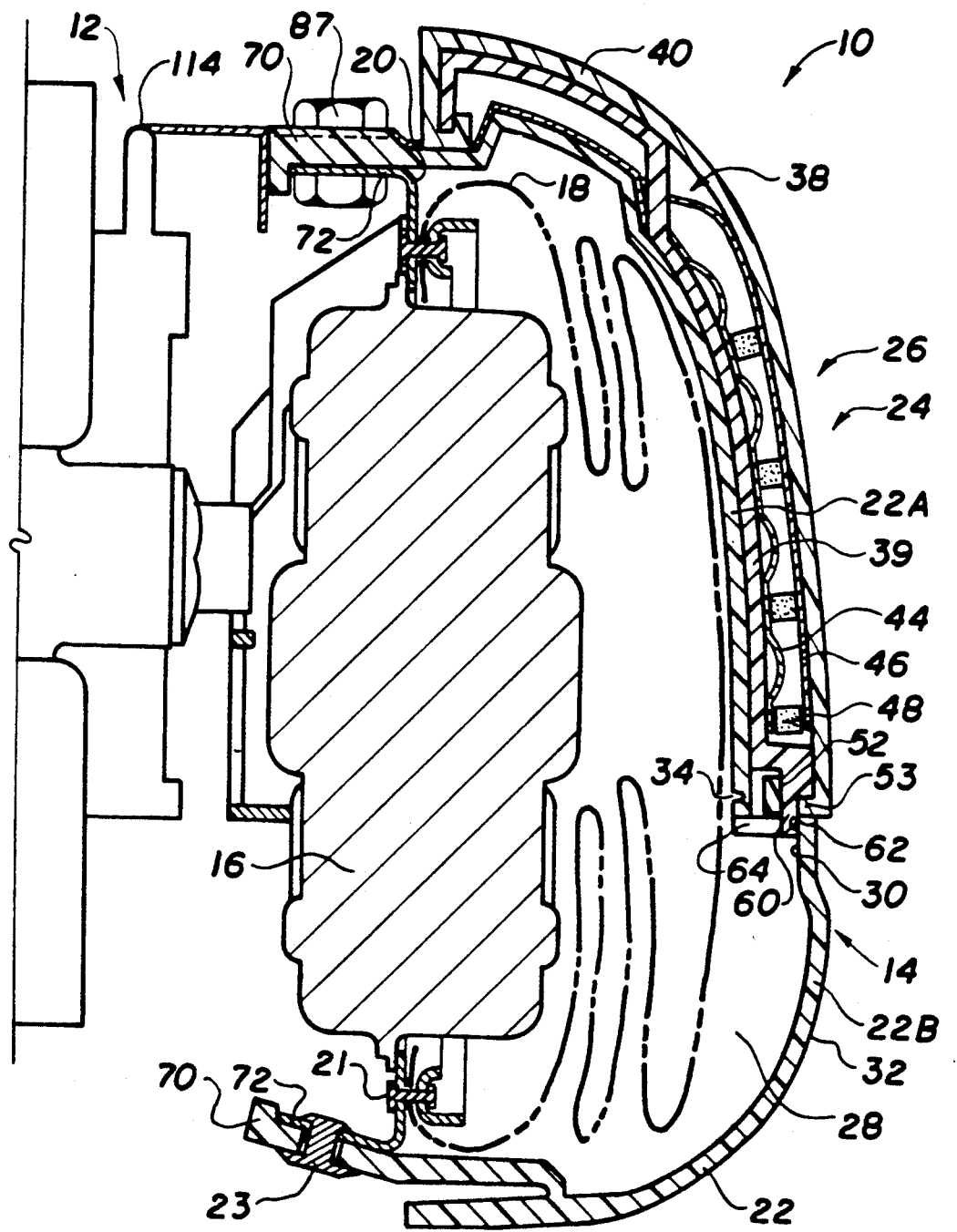
FIG. 1 is a sectional view of an air bag module with a cover assembly according to the present invention.
Figure 12:
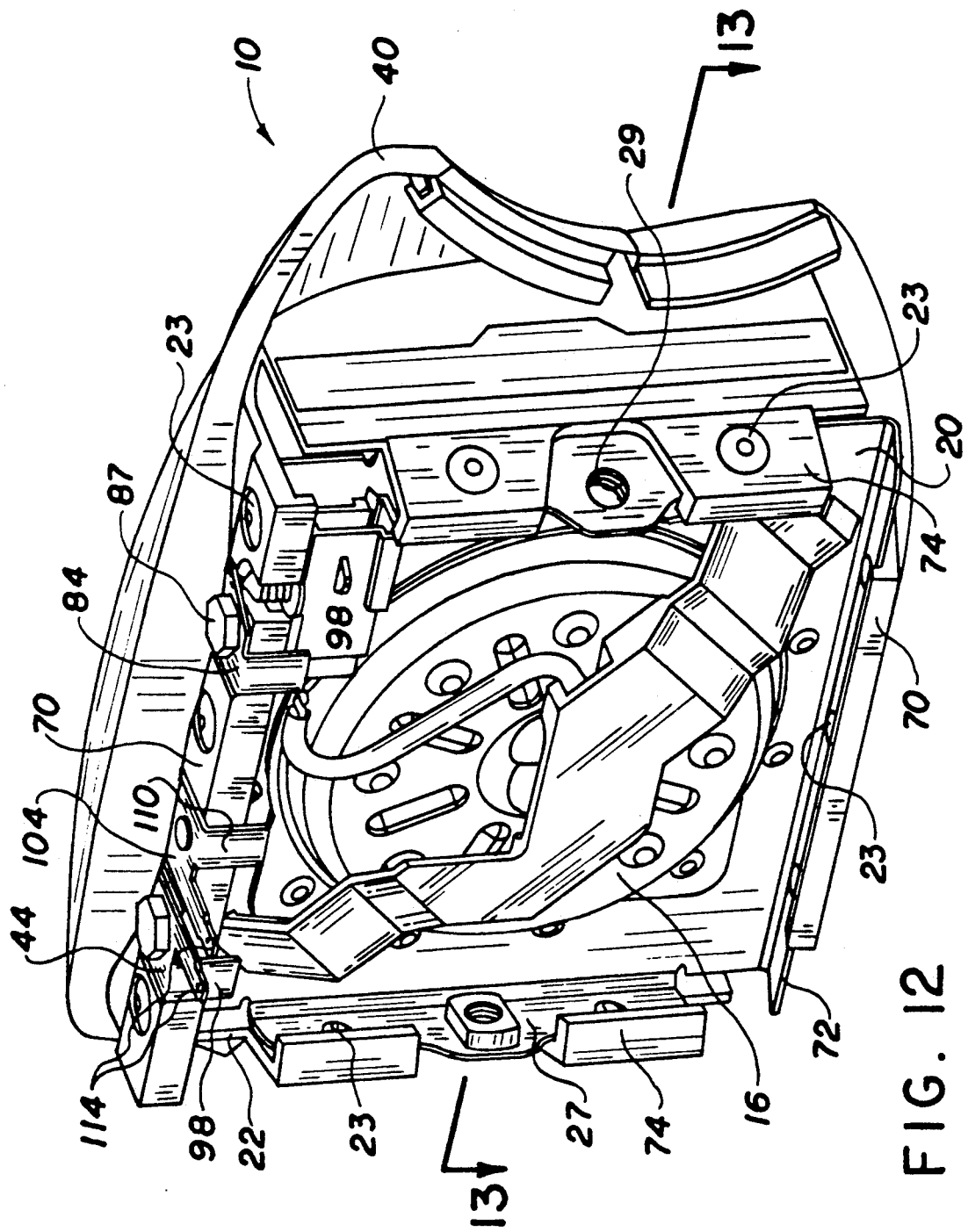
FIG. 12 is a back view of an air bag module to which a cover assembly according to the present invention is attached.

FIG. 1 schematically illustrates a driver side air bag module 10 installed in the steering wheel 12 of a vehicle. The air bag module 10 comprises a container 14 holding an inflator 16 and a folded air bag 18. The container 14 is formed by a reaction plate 20 and a closure 22 which is coupled to the reaction plate 20. The inflator 16 and the air bag 18 are attached to the reaction plate 20 by conventional fasteners, such as rivets 21 (FIG. 1). The closure 22 is also attached to the reaction plate 20 by conventional fasteners, such as rivets 23 (FIGS. 1, 12). A horn blowing switch subassembly 24 is removably attached to the reaction plate 20. The closure 22 and the horn blowing switch subassembly 24 together form a cover assembly 26 for the module 10.

As set forth in the foregoing discussion, various components of the module 10 are coupled to the reaction plate 20. Moreover, the reaction plate 20 has integral side portions 27 (FIG. 12) which are adapted to be fastened (e.g., bolted) through openings 29 to a structural part of the vehicle, to couple the reaction plate (and thereby couple the module) to a vehicle. The reaction plate 20 transmits forces applied to the components of the module during deployment of the air bag to the structural part of the vehicle, thereby maintaining the structural integrity of the components of the module during deployment of the air bag 18.

Figure 13:
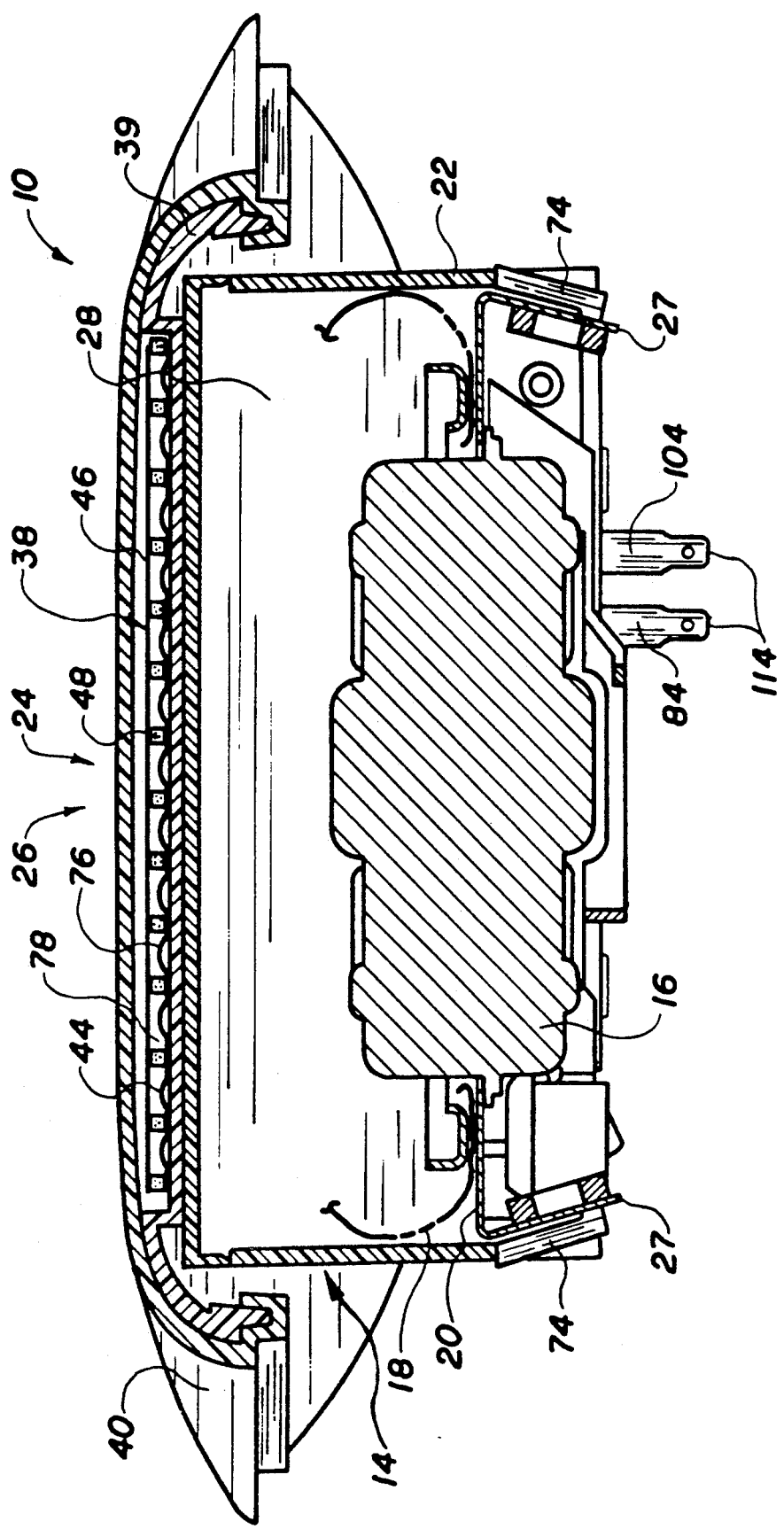
FIG. 13 is a sectional view of the air bag module of FIG. 12, taken along the line 13—13.
Figure 14:
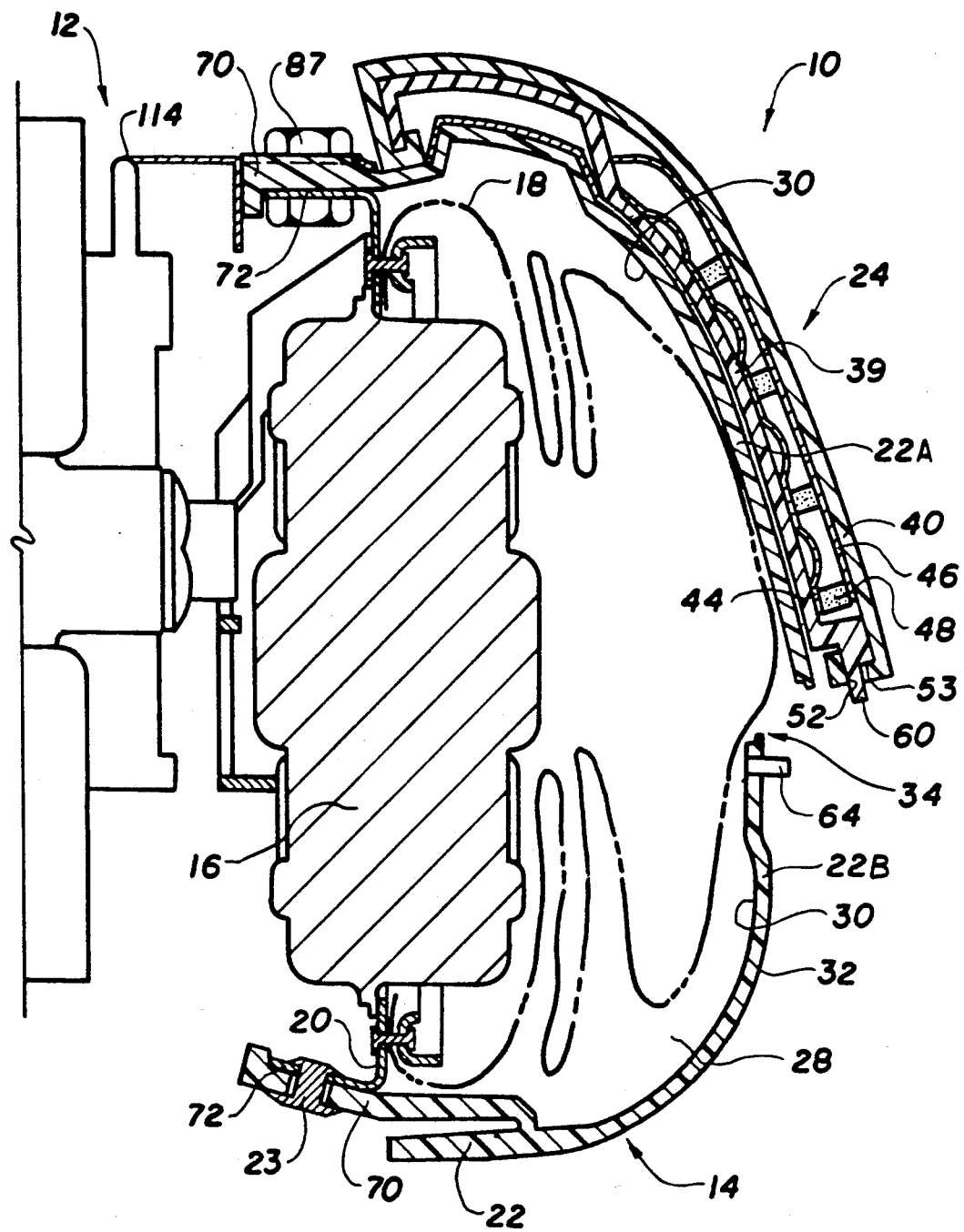
FIG. 14 schematically illustrates the cover assembly during an initial deployment of the air bag.

The closure 22 and the reaction plate 20 define a cavity 28 for the air bag 18 and the inflator 16 (see FIGS. 1, 13, 14). When the module 10 is installed in a vehicle, an inner surface 30 of the closure 22 faces the cavity 28 and interior of the module 10. An outer surface 32 of the closure 22 is presented toward a driver of the vehicle.

A tear seam 34 is formed in the inner surface 30 of the closure 22 (FIG. 1). The closure 22 is preferably molded from a thermoplastic material. The tear seam 34 can either be created during molding of the closure 22 or can be cut into the inner surface 30 of the closure 22. The tear seam 34 forms a weakened area of the closure 22. It enables the closure to separate, under pressure, into a pair of closure portions 22A, 22B.

During operation of the vehicle air bag module 10, gas under pressure is directed from the inflator 16 into the air bag 18. The gas begins to inflate the folded air bag 18 (FIG. 14). The air bag 18 exerts a significant amount of pressure on the inner surface 30 of the closure 22. The pressure causes the closure to separate at the tear seam 34 into the two closure portions 22A, 22B. The closure portions 22A, 22B are forced outward, forming an opening through which the air bag is deployed into the passenger compartment of a vehicle. As the closure separates into closure portions 22A, 22B, the rivets 23 maintain the closure portions 22A, 22B attached to the reaction plate 20.

The horn blowing switch subassembly 24 is removably attached to the closure 22 on the outer surface 32 of the closure portion 22A. The horn blowing switch subassembly 24 comprises a horn blowing switch 38, a rigid support member 39, and a flexible, decorative cover 40 (FIG. 1). The horn blowing switch 38 includes a lower contact member 44 and an upper contact member 46. The lower and upper contact member 44, 46 are separated by a compressible spacer 48 (see FIGS. 1, 10, 11). Alternatively, a membrane and/or other type of flat switching mechanism, may be used instead of the compressible spacer and/or contact members.

The rigid support member 39 is attached to the flexible, decorative cover 40 and to the closure 22, in a manner described hereinafter. The rigid support member 39 is disposed against the closure 22, and provides relatively rigid support for the lower contact member 44 and portions of the cover 40. The cover 40 is attached to the closure 22, in a manner set forth hereinafter, and covers the horn blowing switch 38 (FIG. 1).

Figure 2:
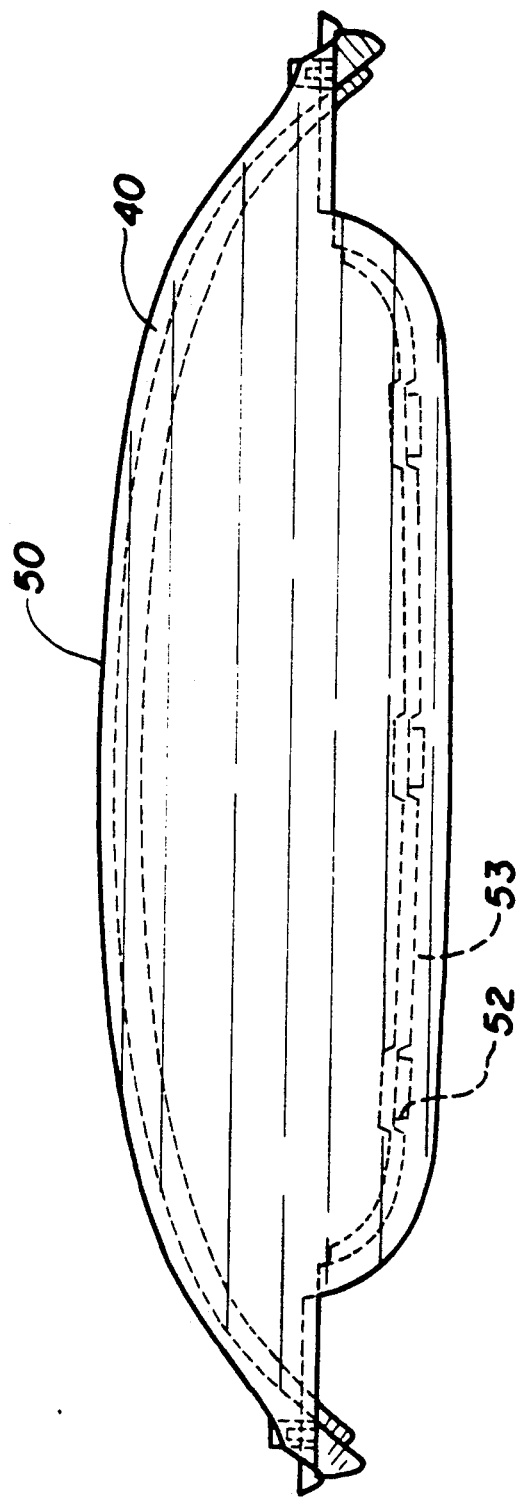
FIG. 2 is a top view of a flexible cover for use in a cover assembly according to the invention.
Figure 3A:
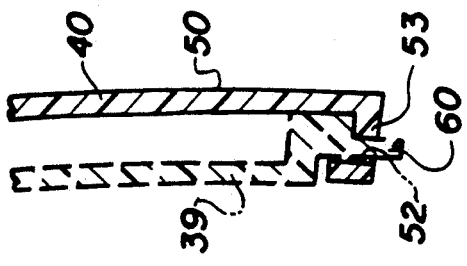
FIGS. 3A and 3B are sectional views of the flexible decorative cover, showing engagement of the rigid support member with the cover.
Figure 3B:
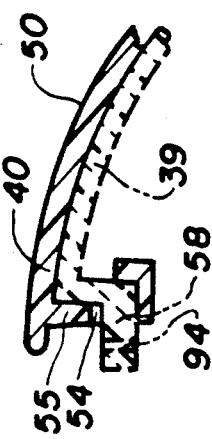
Figure 11:
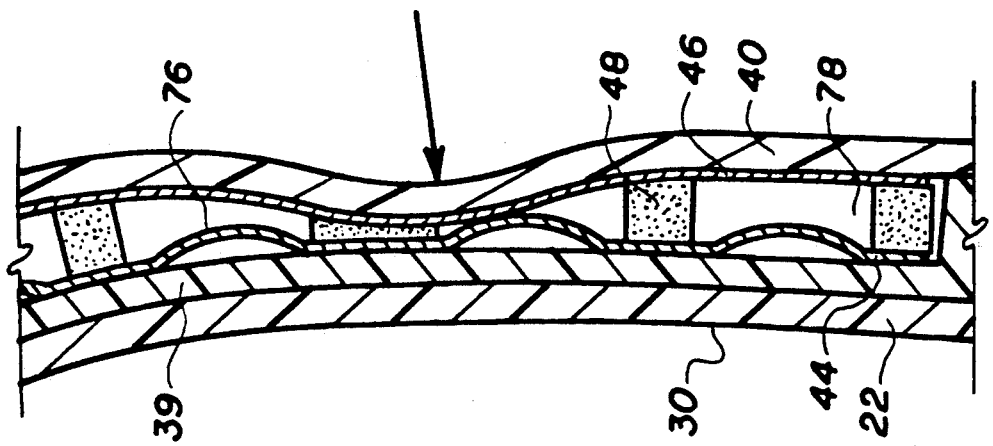
FIG. 11 is a fragmentary, enlarged, sectional view of the cover assembly during actuation of the horn blowing switch.

The cover 40 has an exterior surface 50 (FIGS. 1, 2, 3) which faces a vehicle driver when a module 10 with the cover assembly 26 is installed. The exterior surface 50 of the cover 40 can be decoratively embossed to complement the interior of the vehicle passenger compartment. The cover 40 is made of a flexible, thermoplastic material. It is thereby adapted to communicate physical pressure exerted on it by the vehicle driver to the horn blowing switch 38 to complete a vehicle horn blowing circuit (FIG. 11). Thus, the flexibility of the cover 40 enables the horn blowing switch 38 to be activated by applying manual pressure to the exterior surface 50 of the cover 40.

Figure 4:
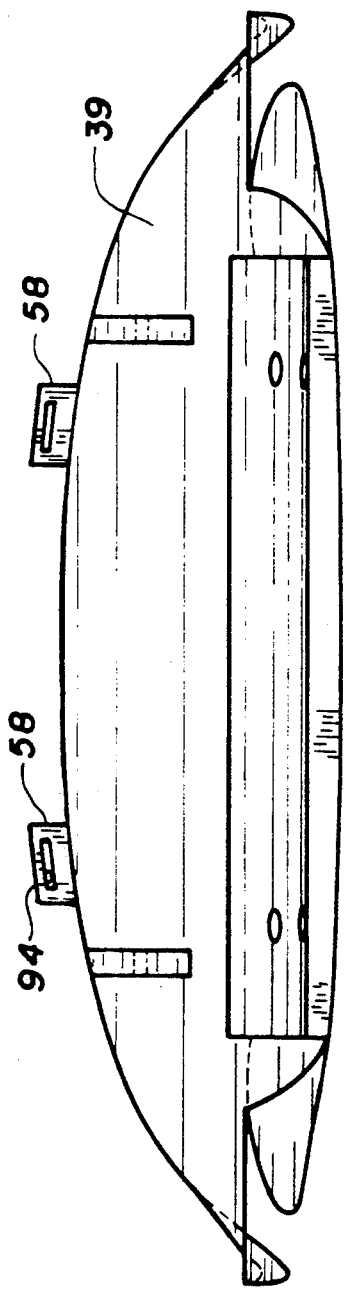
FIG. 4 is a top view of a rigid support member for a cover assembly according to the invention.

The cover 40 has structure at its perimeter which enables it to be attached to the rigid support member 39. Specifically, the cover 40 has three slots 52 formed in a lower flange 53 and two slots 54 formed in an upper flange 55 (see FIGS. 1–3B). The slots 52, 54 in the upper and lower flanges 53, 55 are designed to receive mating tabs on the rigid support member 39, to attach the rigid support member to the cover 40. Specifically, rigid support member 39 has a pair of upper tabs 58 (FIGS. 3B, 4) which extend through the two slots 54 in the upper flange 55 of the cover 40 (see FIGS. 3B, 9B). The rigid support member 39 also has three lower tabs 60 (FIG. 5) which extend through the slots 52 in the lower flange 53 of the cover (see FIGS. 1, 3A). The flexibility of the cover 40 enables the cover 40 to be deflected so as to enable the tabs 58 and 60 to be inserted into slots 54 and 52.

The rigid support member 39 is also adapted to be connected to the closure 22. Specifically, the three lower tabs 60 of the rigid support member 39 are long enough to pass through the slots 52 in the lower flange 53 of the cover 40 and into slots 62 formed in a transverse wall 64 of the closure 22. When the tabs 60 are engaged with the slots 62, the rigid support member 39 is attached to the closure 22 thereby to install the horn blowing switch subassembly 24 on the container 14 of the module 10.

Figure 6A:
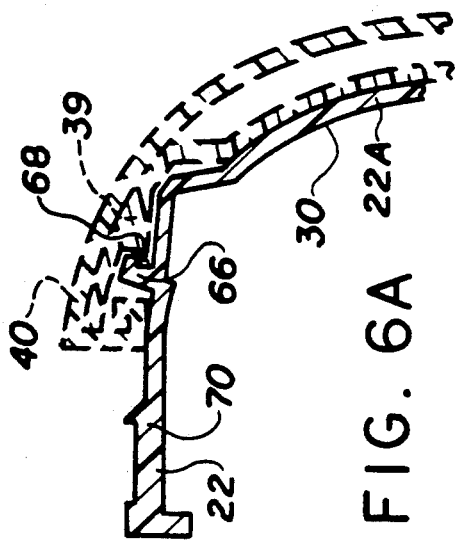
FIG. 6A is a fragmentary sectional view of the cover assembly of the invention, showing engagement of the closure with the rigid support member.
Figure 6:
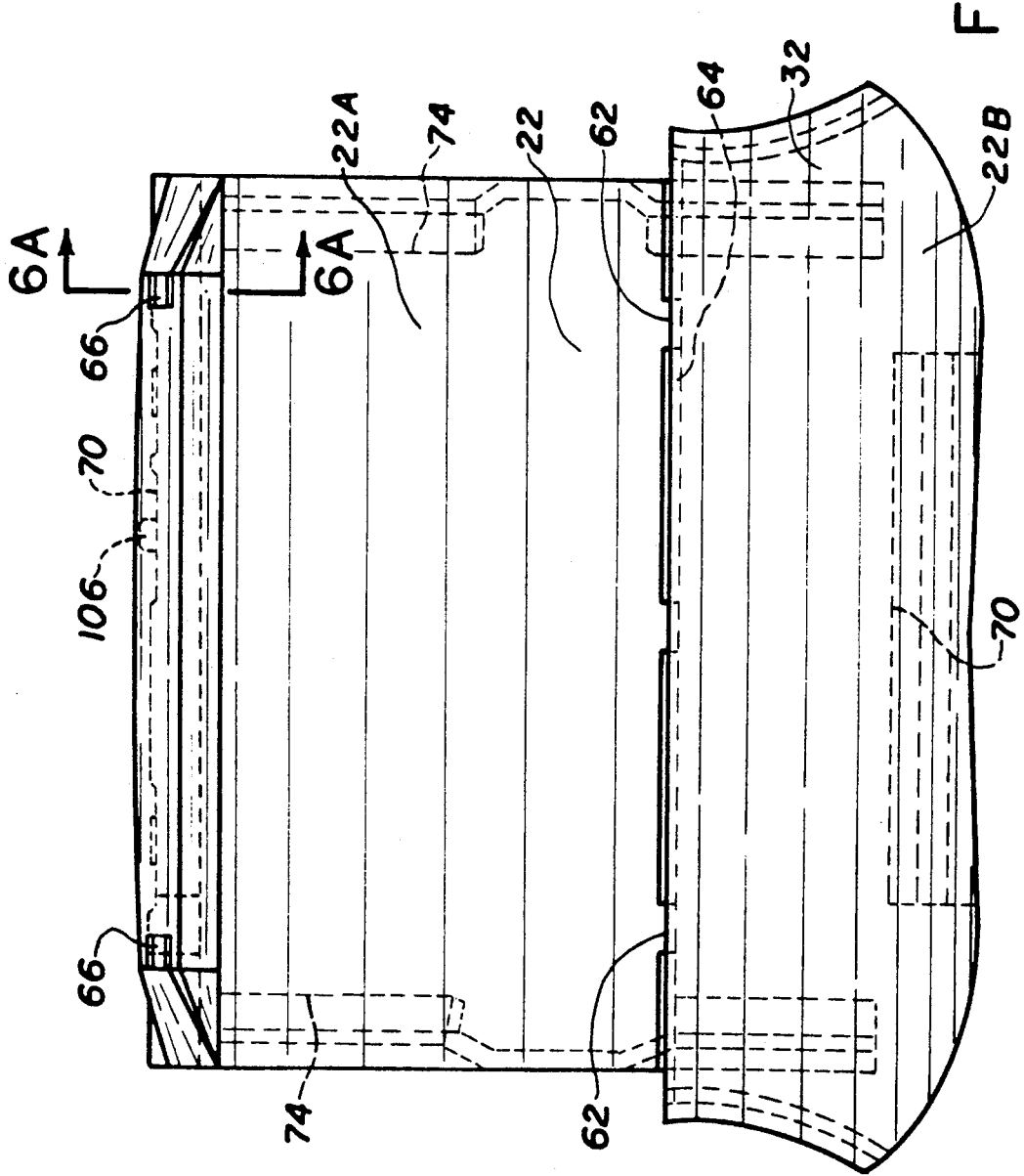
FIG. 6 is a front view of the closure for a cover assembly according to the present invention.
Figure 7:
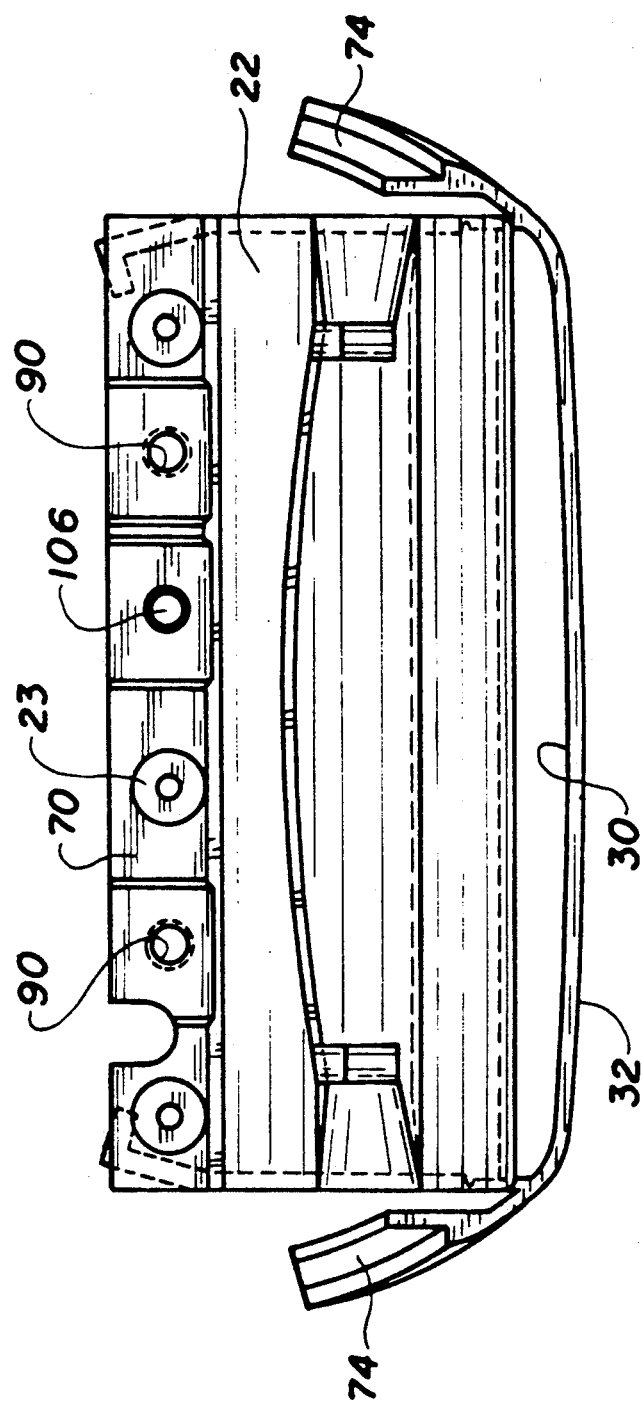
FIG. 7 is a top view of the closure of FIG. 6.

The closure 22 is principally formed by the upper and lower closure portions 22A, 22B. The transverse wall 64 of the closure is formed in the lower closure portion 22B. The upper closure portion 22A has a pair of hook-shaped posts 66 (FIG. 6A) formed in one piece with the remainder of the closure portion. The posts 66 are adapted for mating engagement with tabs 68 on an upper portion of the rigid support member 39. Engagement of the posts 66 and tabs 68 assists with coupling of the rigid support member 39 with the closure 22.

Additionally, the closure 22 has top and bottom flanges 70 which are formed in one piece with the remainder of the closure and which are adapted to overlie flanges 72 in the top and bottom of the reaction plate 20 (see FIG. 12). The closure 22 also has side flanges 74 which are formed in one piece with the remainder of the closure and which are adapted to overlie the side portions 27 of the reaction plate 20 (see also FIG. 12). To assemble the module 10, the closure 22 is attached to the reaction plate 20 by flexing the flanges 70, 74 of the closure 22 over the flanges 72, 27 on the reaction plate (FIG. 12) and inserting rivets 23.

Figure 9B:
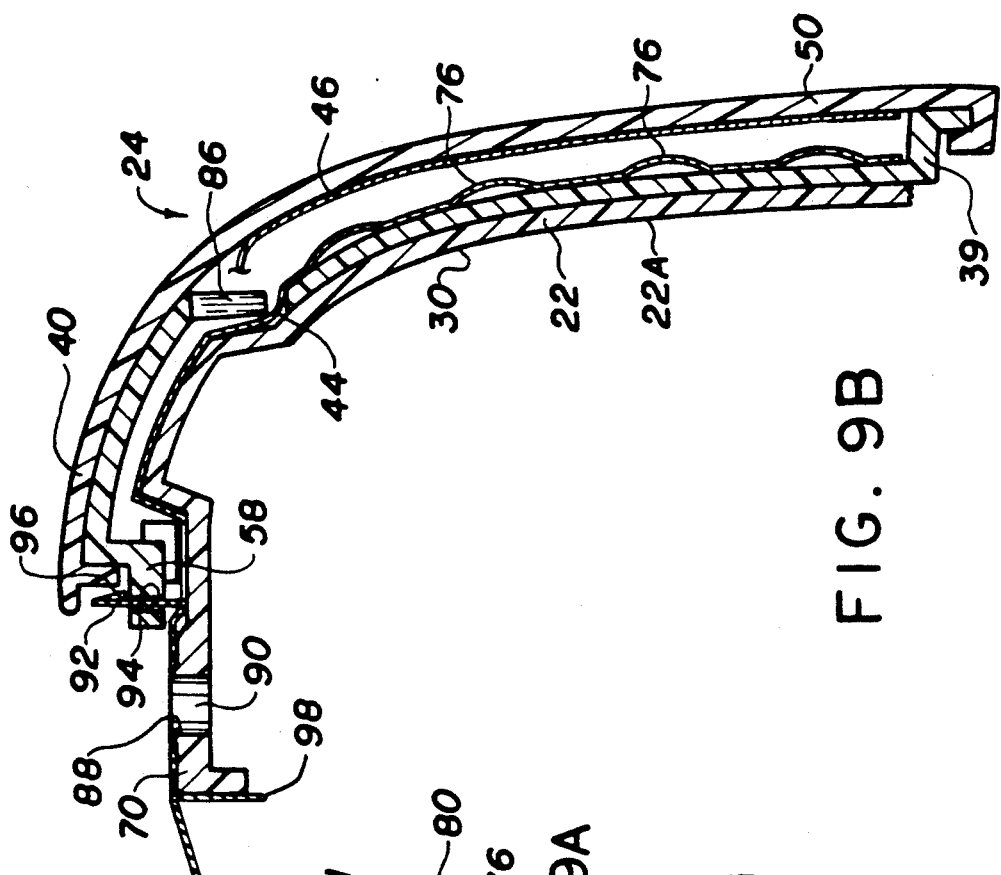
FIG. 9B is a fragmentary, sectional view of a portion of the cover assembly of the invention, showing the installed position of the lower contact member and its relationship to the closure and the rigid support member.
Figure 9:
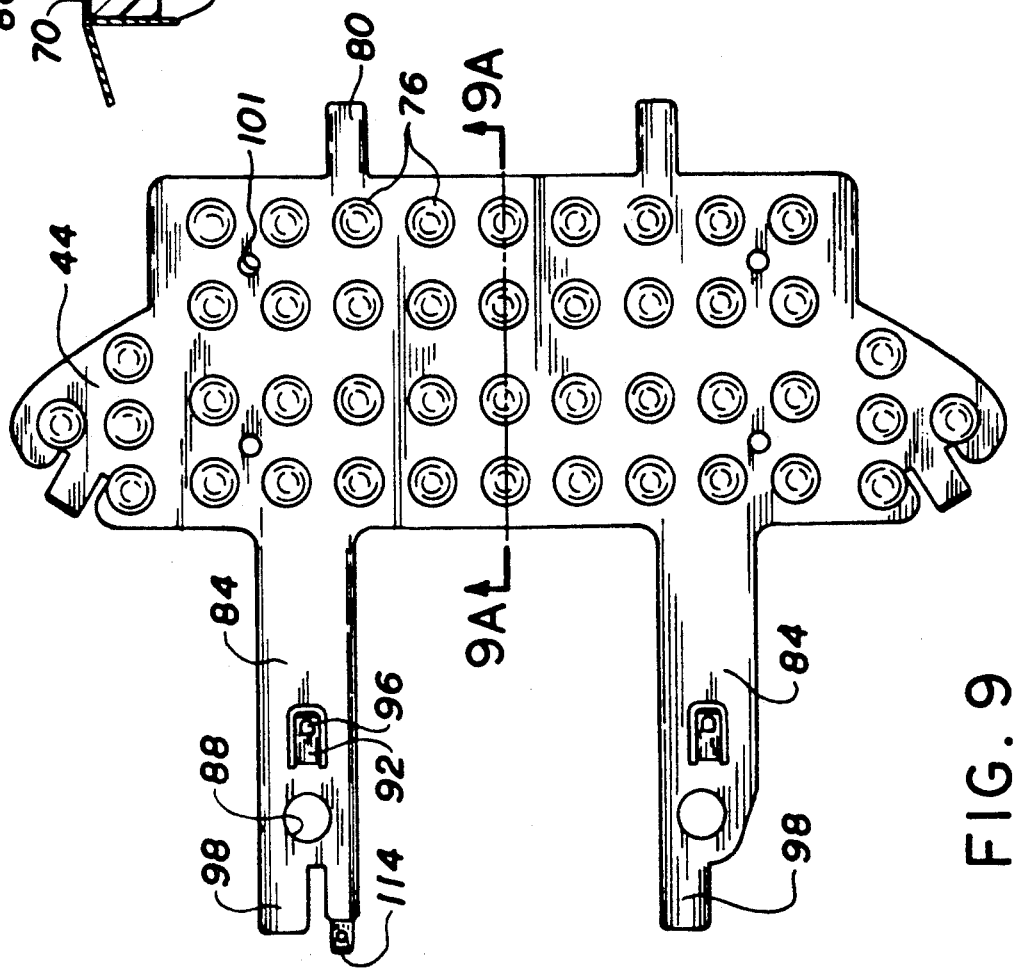
FIG. 9 is a planar view of the lower contact member of the horn blowing switch.
Figure 10:
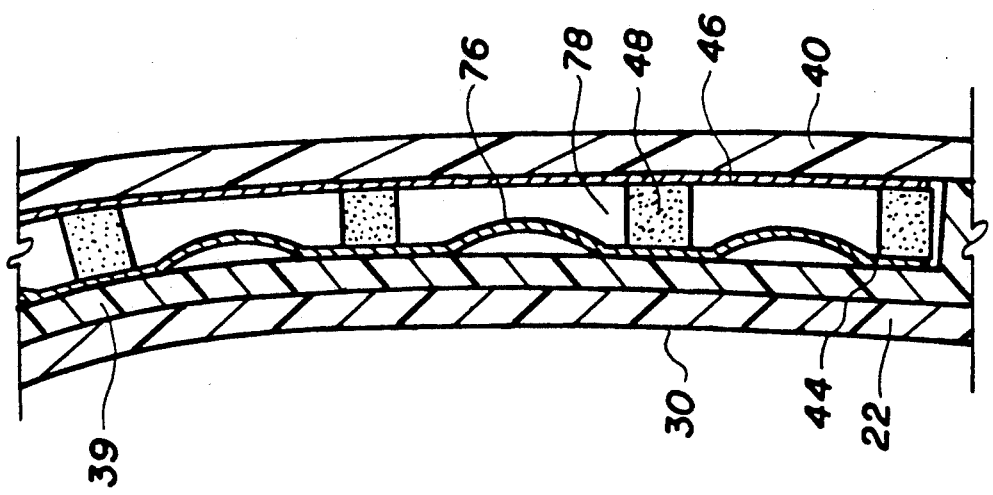
FIG. 10 is a fragmentary, enlarged, sectional view of the cover assembly during normal operation of the vehicle.
Figure 9A:
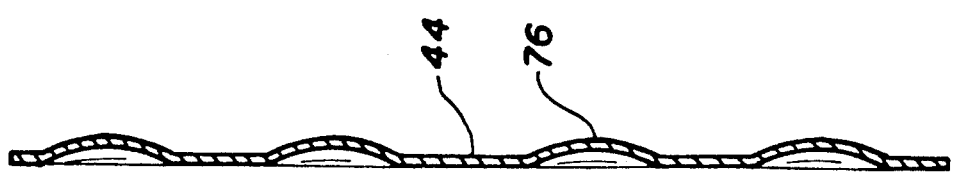
FIG. 9A is a sectional view of the lower contact member of FIG. 9, taken along the line 9A-9A.

As set forth above, the lower contact member 44 (FIG. 9, 9B) of the horn blowing switch 38 is positioned on the top of the rigid support member 39. The lower contact member 44 is secured in position by engagement with the rigid support member and closure 22. Dimples 76 are raised from the surface of the contact member 44 in a direction toward the cover 50. The raised dimples 76 are adapted to engage the upper contact member 46 via openings 78 formed by the compressible spacer 48 at the locations of the dimples 76 (FIGS. 1, 10).

Figure 5:
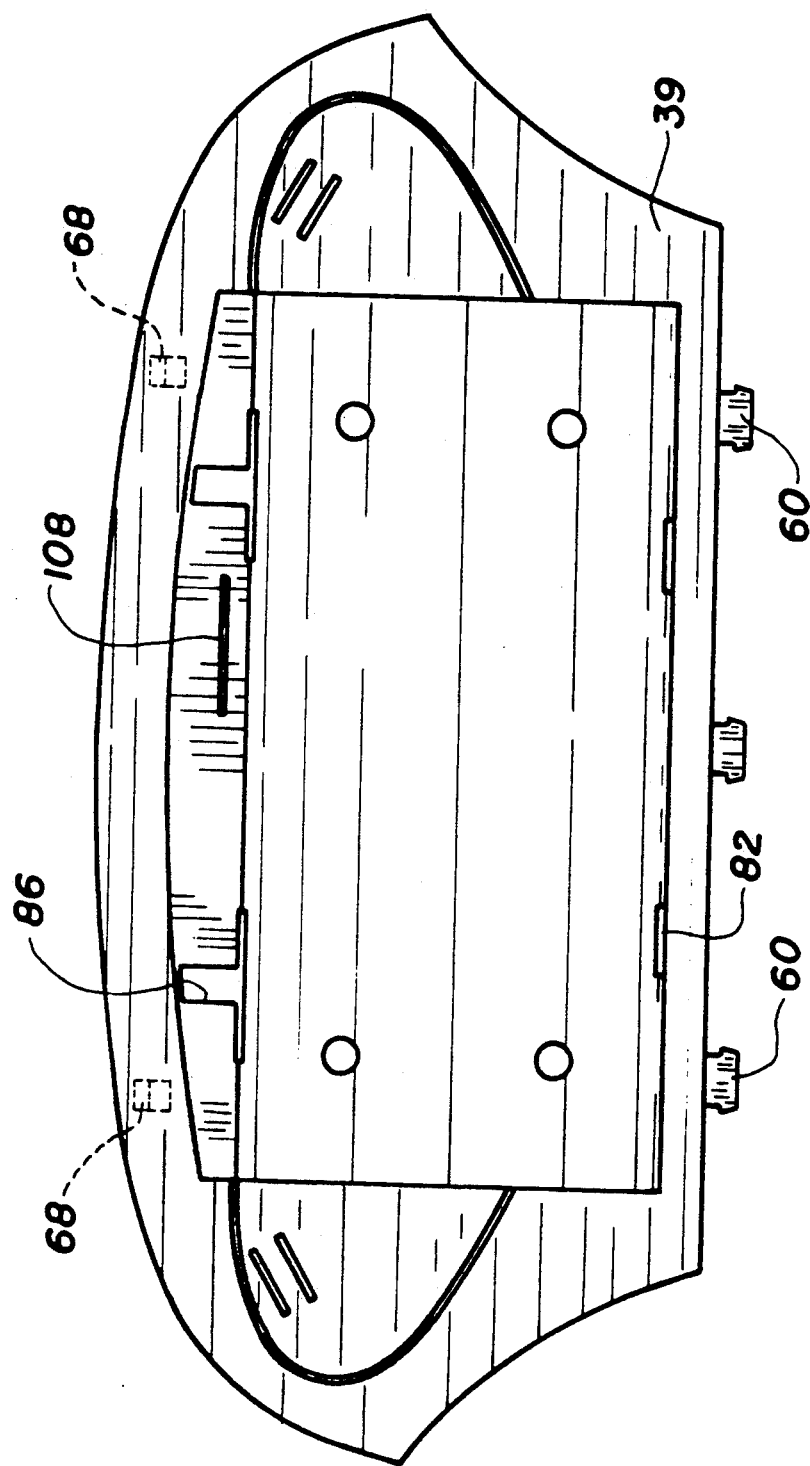
FIG. 5 is a front view of the rigid support member of FIG. 4.

Tabs 80 (FIG. 9) extend from the lower perimeter of the lower contact member 44 for engagement with slots 82 formed in a lower portion of the rigid support member 39. The tabs 80 are inserted into the slots 82 to secure engagement of the lower contact member 44 with the rigid support member 39. Tethers 84 formed in one piece with the contact members 44 extend from the upper perimeter of the lower contact member 44 for engagement with apertures 86 formed in the rigid support member 39 (FIG. 5). The tethers 84 are adapted for supporting engagement with the closure 22. They are removably attached to the closure 22 with conventional fasteners 87 (FIGS. 1, 14). The fasteners 87 project through openings 88 in the tethers 84 and openings 90 in the top flange 70 of the closure (FIG. 9B). The tethers 84 extending through the slots 86 are curved to correspond to the profile of the rigid support member 39 and closure 22.

Locking posts 92, formed as cut-outs in the tethers 84, also secure engagement of the tethers with the rigid support member 39. The posts 92 project through slots 94 formed in the tabs 58 of the rigid support member 39. Locking elements 96 in the posts 92 resist removal of the posts 92 from engagement through the slots 94.

Once the lower contact member 44 is secured to the closure 22 and rigid support member 39, extensions 98 on the ends of the tethers 84 may be bent to surround the top flange 70 of the closure 22. The bent extensions 98 further secure engagement between the lower contact member 46 and closure 22 (FIGS. 9B, 12).

The upper contact member 46 (FIGS. 8, 8A) has a substantially smooth surface 100 on a side of member facing the lower contact member 44. The compressible spacer 48 is attached to the smooth surface 100 of the upper contact member 46 by gluing or other means. FIGS. 10 and 11 illustrate the relative relationship between the upper and lower contact members of the horn blowing switch 38 in the resting and operating positions, respectively. Openings 101 are provided in both the lower and upper contact members 44, 46. Alignment pins (not illustrated) project through the openings 101 to help maintain proper alignment of the two members 44, 46 with respect to one another during operation.

During operation of the horn blow switch subassembly 24, by the application of pressure to the cover 40, the upper contact member 46 is engaged with the dimples 76 of the lower contact member 44 through the openings 78 formed by the compressible spacer 48 surrounding the dimples (FIG. 11).

Figure 8A:
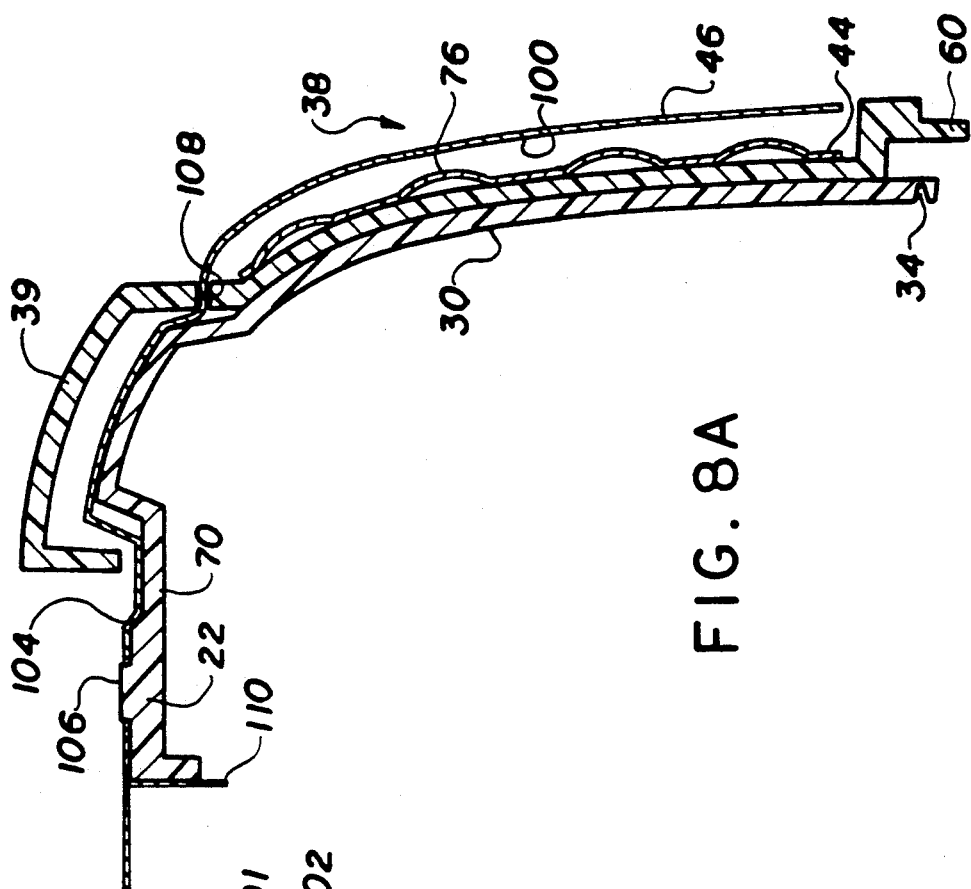
FIG. 8A is a fragmentary sectional view of the cover assembly of the invention, showing the installed position of the upper contact member, and its relationship to the closure and the rigid support member.
Figure 8:
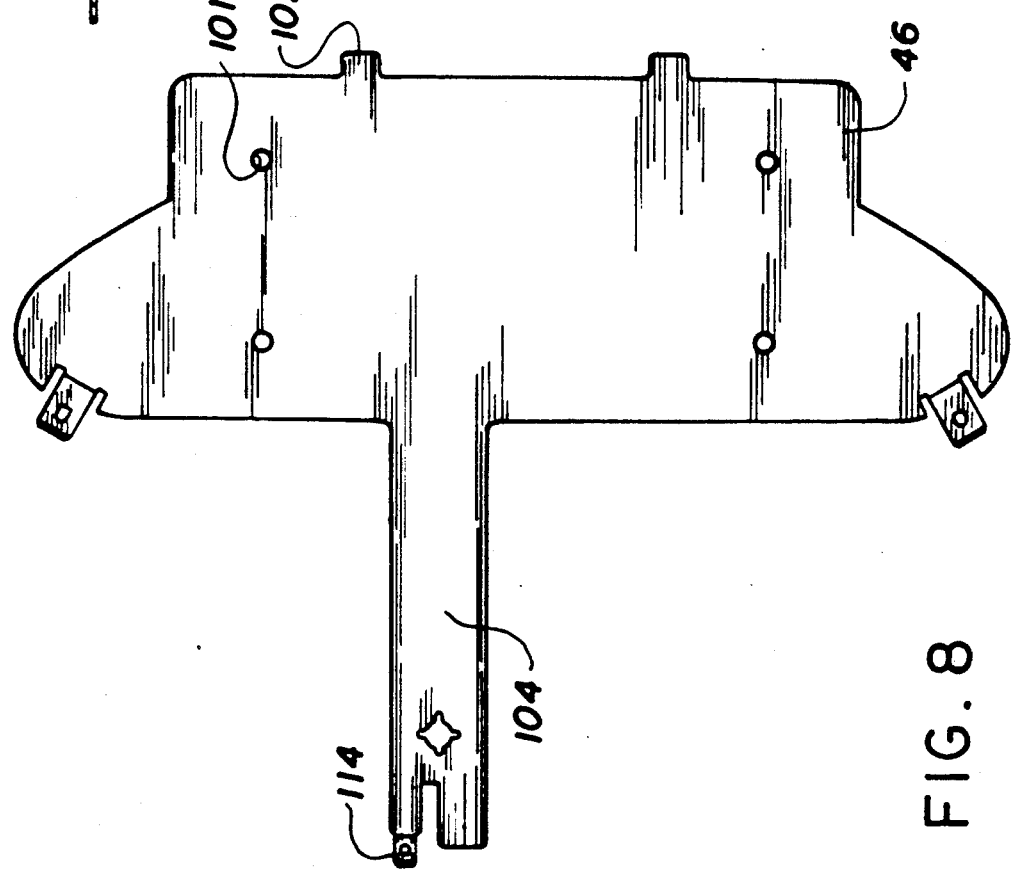
FIG. 8 is a planar view of the upper contact member of the horn blowing switch.

The upper contact member 46 is positioned on top of the lower contact member 44 and in engagement with the rigid support member 39 and the closure 22. Tabs 102 extend from the lower perimeter of the upper contact member 46 for engagement with the rigid support member 39. A tether 104 formed in one piece with the upper contact member 46 extends from the upper perimeter of the upper contact member for engagement with a boss 106 formed in the closure 22 (FIG. 8A). The tether is received in a slot 108 formed in the rigid support member 39 intermediate the slots 84 which engage the lower contact member 44. Like the tethers 84, the tether 104 extending through the slot 108 is also curved to correspond to the profile of the rigid support member 39 and the closure 22. Once the tether 104 of the upper contact member 46 is engaged through the rigid support member 39 and over the boss 106 on the closure 22, an extension 110 on the tether may be bent to surround the top flange 70 of the closure 22 and further secure engagement between the upper contact member 46 and closure.

As illustrated in FIG. 12, the tethers 84, 104 of the respective contact members 44, 46, pass through their associated slots 86, 108 in the rigid support member 39 to provide access to an electrical connection with the vehicle horn blowing circuit externally from the module. Contacts 114 are provided on the tethers 84, 104 of the lower and upper contact members 44, 46 to connect the contact members with electrical elements external of the module to complete the horn blowing circuit (FIGS. 1, 14).

As described, the rigid support member 39 is positioned on top of the closure 22 forming the container 14. The horn blowing switch 38 is located on top of the rigid support member 39, and the cover 40 is on top of the contact members 44, 46 and connected to the rigid support member. Engagement of the cover 40 and contact members 44, 46 with the rigid support member 39 and closure 22 thus forms an integral unit which moves together during deployment of the air bag 18 and separation of the closure into closure portions 22A, 22B.

During operation of the vehicle air bag module during an emergency, the inflator 16 of the module 10 is actuated to force gas generated under pressure into the air bag 18. The force of the inflating air bag 18 separates the closure 22 at the tear seam 34 into closure portions 22A, 22B (FIG. 14), and forms an opening for deployment of the air bag 18. The force exerted by the air bag disengages the tabs 60 of the rigid support member 39 from the slots 52, 62 in the cover 40 and transverse wall 64 of the closure 22. The integral unit formed by the closure portion 22A and horn blowing switch subassembly 24 remains intact and attached to container 14 at the tethers 84, 104 of the contact members 44, 46. Thus, the integrity of the horn blowing switch subassembly 24 is maintained during deployment of the air bag 18.

Construction of the present invention according to a preferred embodiment also permits easy repair or replacement of elements of the horn blowing switch 38, should it become necessary. The horn blowing switch subassembly 24 can be removed from the closure 22 by removing the lower tabs 60 of the rigid support member 39 from engagement with the slots 52, 62 in the cover 40 and closure 22, respectively. The fasteners 87 can then be removed to disconnect the tethers 84, 104 of the contact members 44, 46 of the horn blowing switch 38 from the air bag module 10. After repair, the horn blowing switch 38 can easily be re-installed by attaching the tethers 84, 104 to the container 14 via fasteners 87, and snapping the tabs 60 of the rigid support member 39 into position within the slots 62, 52 of the closure 22 and cover 40. Should the horn blowing switch 38 or horn blowing switch subassembly 24 become irreparably damaged, new parts can be installed in the same manner. This method of detaching the horn blowing switch subassembly 24 for servicing can be accomplished without disturbing the air bag 18 or the air bag module 10.

The construction of the air bag module cover assembly 26 according the present invention has been described in its preferred form. However, with the present disclosure in mind, it is believed that obvious alternatives to the preferred embodiment, to achieve comparable advantages in other air bag module cover assemblies, will become apparent to the those of ordinary skill in the art.

What is claimed:

1. A vehicle air bag module cover assembly, comprising:
    a closure attached to a reaction device to complete a container for an inflator and a folded air bag, at least part of said closure being movable relative to the container upon deployment of the air bag;
    a horn blowing switch overlying said part of said closure adapted to move relative to the container upon deployment of the air bag, said horn blowing switch being connected to an external portion of the container in such a manner that said horn blowing switch is removable intact from said container, said horn blowing switch normally assuming a disengaged condition and being responsive to the application of pressure to assume an engaged condition, said horn blowing switch when in said engaged condition completing a horn blowing circuit; and
    a flexible cover for said horn blowing switch, said flexible cover being adapted to communicate physical pressure exerted thereon to said horn blowing switch to cause said horn blowing switch to assume an engaged condition.

2. A vehicle air bag module cover assembly as defined in claim 1, wherein said cover assembly enables said air bag to be deployed therethrough;
    said horn blowing switch comprising a pair of contact members which are biased to said disengaged condition and which are movable relative to one another to contact each other and thereby cause said horn blowing switch to assume said engaged condition;
    said contact members being connected to the external portion of the container to connect the horn blowing switch to the external portion of the container; and
    said external portion of the container to able to retain the contact members connected with the external portion of the container during deployment of said air bag through the cover assembly.

3. A vehicle air bag module cover assembly as set forth in claim 1, wherein said horn blowing switch and said cover form part of a horn blowing switch subassembly, said horn blowing subassembly further including a relatively rigid support member connected with said horn blowing switch and with said cover, said horn blowing switch being supported on said relatively rigid support member and being disposed between said cover and said relatively rigid support member.

4. A vehicle air bag module cover assembly as set forth in claim 3, wherein said horn blowing switch comprises a pair of contact members and compressible spacers between said contact members, said rigid support member forming a rigid backing for one of said pair of contact members.

5. A vehicle air bag module cover assembly, comprising:
    a closure attached to a reaction device to complete a container for an inflator and a folded air bag, said closure enabling said air bag to be deployed therethrough;
    a horn blowing switch removably connected to an external portion of the container and located on an outer surface of said closure, said horn blowing switch normally assuming a disengaged condition and being responsive to the application of pressure to assume an engaged condition, said horn blowing switch when in said engaged condition completing a horn blowing circuit, said horn blowing switch comprising a pair of contact members which are biased to said disengaged condition and which are movable relative to one another to contact each other and thereby cause said horn blowing switch to assume said engaged condition, each of said pair of contact members including an integral portion connected to the external portion of the container to connect the horn blowing switch to the external portion of the container, said integral portion of each of said contact members forming a tether which retains the contact member connected to the external portion of the container during deployment of said air bag through the cover assembly; and a flexible cover for said horn blowing switch, said flexible cover being adapted to communicate physical pressure exerted thereon to said horn blowing switch to cause said horn blowing switch to assume an engaged condition.

6. A vehicle air bag module cover assembly as defined in claim 5 wherein said flexible cover is connected with said contact members and remains connected with said contact members during deployment of said air bag through said cover assembly.

7. A vehicle air bag module cover assembly as defined in claim 6 wherein said cover and said contact members form a horn blowing switch subassembly and said tethers formed by said integral portion of said contact members connect said horn blowing switch subassembly with the external portion of the container during deployment of said air bag through said cover assembly.

8. A vehicle air bag module cover assembly as defined in claim 7 wherein said closure is separable into at least two closure portions to enable deployment of said air bag through said cover assembly; and said horn blowing switch subassembly is connected to said closure so as to overlie one of said closure portion, said horn blowing assembly switch subassembly being movable with said one of said closure portions as said closure portions separate during deployment of an air bag through said cover assembly.

9. A vehicle air bag module cover assembly, comprising:
a closure attached to a reaction device to complete a container for an inflator and a folded air bag; and
a horn blowing switch subassembly removably connected to an external portion of the container and located on an outer surface of said closure, said horn blowing switch subassembly comprising a relatively rigid support member, a horn blowing switch being supported on and connected to said support member, and a flexible cover connected to said support member so that said horn blowing switch is intermediate said cover and said support member, said horn blowing switch normally assuming a disengaged condition and being responsive to the application of pressure to assume an engaged condition, said flexible cover adapted to communicate physical pressure exerted thereon to said horn blowing switch to move said horn blowing switch to assume an engaged condition, said horn blowing switch further comprising a pair of contact members and compressible spacers between said contact member, said support member forming a relatively rigid backing for one of said pair of said contact members, each of said contact members having an integral portion extending through said support member and being connected to the container, said integral portions of said contact members forming tethers to maintain the horn blowing switch connected to the container, said support member and said cover being connected together and being further connected with said contact members such that said horn blowing switch subassembly is an integral unit which is connected to the container by means of said integral portions of said contact members.

10. A vehicle air bag module cover assembly as defined in claim 9, wherein said integral portions of said contacts are removably connected with the external portion of the container, so that said horn blowing switch subassembly can be connected to the container as an integral unit and detached from the container as an integral unit.

11. A vehicle air bag module, comprising:
a container holding an inflator and a folded air bag, said container being adapted to be connected to a portion of a vehicle;
a cover assembly for said container comprising a closure and a horn blowing switch subassembly attached to said container, said cover assembly enabling said air bag to be deployed through said cover assembly, said horn blowing switch subassembly overlying said closure, said closure and said horn blowing switch subassembly being removably coupled to the container by means of a common fastening device; and
said horn blowing switch subassembly including a horn blowing switch which is selectively operable to an engaged condition to complete a horn blowing circuit, said common fastening device being accessible and removably coupled to said container while said container is connected to a portion of a vehicle to enable said horn blowing switch subassembly to be removably coupled to said container without removing said container from the portion of the vehicle and to enable said horn blowing switch subassembly to be removable intact from said cover assembly.

12. A vehicle air bag module as defined in claim 11 wherein said container comprises a reaction device and said closure is connected to said reaction device;
said closure being separable into at least two closure portions to enable deployment of said air bag through said cover assembly; and
said horn blowing switch subassembly overlying at least one of said closure portions and being movable with one of said closure portions upon deployment of the air bag, said horn blowing switch being connected with said reaction device in such a manner that the horn blowing assembly switch subassembly remains connected with said reaction device during deployment of an air bag through said cover assembly.

13. A vehicle air bag module as set forth in claim 12, wherein said horn blowing switch has a portion connected with said reaction device forming a tether to maintain the horn blowing switch subassembly connected with said reaction device during deployment of an air bag through said cover assembly.

14. A vehicle air bag module as set forth in claim 11, wherein said horn blowing switch subassembly, further comprises a rigid support member and a flexible cover member, said horn blowing switch being supported on said rigid support member and being disposed between said cover and said rigid support member, said flexible cover member being adapted to communicate physical pressure exerted on said cover member to said horn blowing switch to move said horn blowing switch to said engaged condition.

15. A vehicle air bag module as set forth in claim 14, wherein said horn blowing switch comprises a pair of contact members and compressible spacers between said contact members, said rigid support member forming a rigid backing for one of said pair of contact members.

16. A vehicle air bag module comprising: a container holding an inflator and a folded air bag, and a cover assembly for said container;

said container being adapted to be connected to a portion of a vehicle;

said cover assembly comprising a closure and a horn blowing switch subassembly attached to said container and overlying said closure;

said cover assembly enabling said air bag to be deployed through said cover assembly;

said closure and said horn blowing switch subassembly being removably coupled to the container by means of a common fastening device;

said horn blowing switch subassembly including a horn blowing switch which is selectively operable to an engaged condition to complete a horn blowing circuit;

said common fastening device being accessible and removably coupled to said container while said container is connected to a portion of a vehicle to enable said horn blowing switch subassembly to be removably coupled to said container without removing said container from the portion of the vehicle;

said container comprising a reaction device connected to said closure;

said closure being separably into at least two closure portions to enable deployment of said air bag through said cover assembly;

said horn blowing switch subassembly overlying at least one of said closure portions and being movable with one of said closure portions upon deployment of the air bag;

said horn blowing switch being connected with said reaction device in such a manner that the horn blowing assembly switch subassembly remains connected with said reaction device during deployment of an air bag through said cover assembly;

said horn blowing switch having a portion connected with said reaction device forming tether to maintain the horn blowing switch subassembly connected with said reaction device during deployment of an air bag through said cover assembly;

said portion of said horn blowing switch being removably connected with an external portion of said container in a manner such that said horn blowing switch subassembly can be connected to said container as an integral unit and detached from said container as an integral unit.

17. A vehicle air bag module, comprising:

a container holding an inflator and a folded air bag, said container being adapted to be connected to a portion of a vehicle;

a cover assembly for said container comprising a horn blowing switch subassembly attached to said container, said cover assembly enabling said air bag to be deployed through said cover assembly;

said horn blowing switch subassembly including a horn blowing switch which is selectively operable to an engaged condition to complete a horn blowing circuit, said horn blowing switch subassembly being detachable from said container without removing said container from the vehicle, said horn blowing switch subassembly further comprising a relatively rigid support member and a flexible cover member, said horn blowing switch being supported on said support member and being disposed between said cover and said support member, said flexible cover member being adapted to communicate physical pressure exerted on said cover member to said horn blowing switch to move said horn blowing switch to said engaged condition, said horn blowing switch comprising a pair of contact members and compressible spacers between said contact members, said support member forming a relatively rigid backing for one of said pair of said contact members, each of said contact members having an integral portion extending through said support member and being connected to the container, said integral portion of said contact member forming a tether to maintain the horn blowing switch subassembly attached to the container as said air bag is being deployed through said cover assembly.

18. A vehicle air bag module as defined in claim 17, wherein said integral portions of said contact members are removably connected with an external portion of the container, so that said horn blowing switch subassembly can be connected to the container as an integral unit and detached from the container as an integral unit.

19. A vehicle air bag module cover assembly comprising:

a closure for attachment to a reaction device to form a container for a folded air bag, a first portion of the container being movable relative to a second portion of the container upon deployment of the air bag, said first and second portions of the container being joined to each other along a seam, said first portion of the container including at least a part of the closure;

a member disposed adjacent to said at least a part of the closure and being movable relative to the second portion of the container upon deployment of the air bag, said member being located substantially on one side of said seam and being held adjacent to said at least a part of the closure at spaced apart locations which are different distances from said seam, said member and said at least a part of the closure having portions coextensive with one another; and a horn blowing switch removably disposed between said coextensive portions of said member and said at least a part of the closure, the horn blowing switch being movable with at least one of said member and said at least a part of the closure relative to said second portion of the container upon deployment of the air bag, the horn blowing switch normally assuming a disengaged condition and being responsive to the application of pressure to assume an engaged condition, at least one of said coextensive portions of said member and said at least a part of the closure being formed and positioned to communicate physical pressure exerted on said at least one of the coextensive portions to said horn blowing switch to cause the horn blowing switch to assume its engaged condition, said member and said at least a part of the closure being releasably held adjacent to each other at at least one of said locations to permit relative movement between said member and said at least a part of the closure and removal of said switch from between said member and said at least a part of the closure.

* * * * *